(12) United States Patent
Shan et al.

(10) Patent No.: US 11,280,908 B2
(45) Date of Patent: Mar. 22, 2022

(54) OBSTACLE DETECTION BY GLOBAL SHUTTER IMAGE SENSOR

(71) Applicant: Black Sesame International Holding Limited, Santa Clara, CA (US)

(72) Inventors: Jizhang Shan, Los Gatos, CA (US); Kuochin Chang, Cupertino, CA (US)

(73) Assignee: BLACK SESAME TECHNOLOGIES INC., San Jose, CA (US)

( * ) Notice: Subject to any disclaimer, the term of this patent is extended or adjusted under 35 U.S.C. 154(b) by 541 days.

(21) Appl. No.: 16/044,189

(22) Filed: Jul. 24, 2018

(65) Prior Publication Data
US 2019/0056503 A1 Feb. 21, 2019

Related U.S. Application Data

(60) Provisional application No. 62/545,535, filed on Aug. 15, 2017.

(51) Int. Cl.
| | | |
|---|---|---|
| *G01S 17/00* | (2020.01) | |
| *G01S 17/93* | (2020.01) | |
| *G01S 7/484* | (2006.01) | |
| *G01S 17/10* | (2020.01) | |
| *G01S 7/497* | (2006.01) | |
| *G01S 17/89* | (2020.01) | |
| *G01S 7/486* | (2020.01) | |
| *G01S 17/04* | (2020.01) | |

(52) U.S. Cl.
CPC .............. *G01S 17/93* (2013.01); *G01S 7/484* (2013.01); *G01S 7/486* (2013.01); *G01S 7/497* (2013.01); *G01S 17/04* (2020.01); *G01S 17/10* (2013.01); *G01S 17/89* (2013.01)

(58) Field of Classification Search
USPC ........................................................ 356/5.01
See application file for complete search history.

(56) References Cited

U.S. PATENT DOCUMENTS

| | | | |
|---|---|---|---|
| 2013/0214129 A1* | 8/2013 | Kobayashi ............. | H04N 5/341 250/208.1 |
| 2014/0183263 A1* | 7/2014 | Chen .................. | G06K 7/10752 235/440 |
| 2015/0379320 A1* | 12/2015 | Slowik ............... | G06K 7/10732 235/455 |

(Continued)

FOREIGN PATENT DOCUMENTS

WO 2017141957 8/2017

*Primary Examiner* — James R Hulka
(74) *Attorney, Agent, or Firm* — Timothy T. Wang; Ni, Wang & Massand, PLLC

(57) ABSTRACT

A system to avoid obstacles, having an infrared emitter emitting an infrared pulse, an infrared receiver aligned with the infrared emitter so as to receive a reflection of the infrared pulse, a timer coupled to the infrared emitter and infrared receiver, the timer controlling a length of time the infrared emitter emits the infrared pulse and an exposure duration of the infrared receiver, the timer simultaneously initiates the emitting of the infrared pulse and an initiation of the exposure duration of the infrared receiver, and a controller coupled to the timer, the infrared emitter and the infrared receiver to adjust the exposure duration of the infrared receiver to determine a distance of an object reflecting the emitted infrared pulse.

20 Claims, 4 Drawing Sheets

(56) References Cited

U.S. PATENT DOCUMENTS

| | | | |
|---|---|---|---|
| 2016/0104732 A1* | 4/2016 | Kobayashi | H01L 27/14609 |
| | | | 250/208.1 |
| 2016/0127698 A1* | 5/2016 | Mali | G01C 3/08 |
| | | | 348/62 |
| 2016/0360124 A1* | 12/2016 | Shan | H04N 9/04555 |
| 2017/0059712 A1* | 3/2017 | Yates | G01S 17/18 |
| 2018/0088214 A1* | 3/2018 | O'Keeffe | G01S 7/489 |
| 2018/0268181 A1* | 9/2018 | Slowik | G06K 7/1095 |
| 2018/0284247 A1* | 10/2018 | Campbell | G01S 17/42 |
| 2018/0284275 A1* | 10/2018 | LaChapelle | G01S 7/4861 |
| 2018/0284279 A1* | 10/2018 | Campbell | G01S 7/4812 |
| 2018/0329063 A1 | 11/2018 | Takemoto et al. | |
| 2018/0343401 A1* | 11/2018 | Campbell | H04N 5/2256 |

* cited by examiner

OBSTACLE DETECTION BY GLOBAL SHUTTER IMAGE SENSOR

BACKGROUND

Technical Field

The instant disclosure may be applicable to obstacle detection, more specifically to obstacle detection utilizing global shutter image sensors.

Background

Obstacle detection may be applied in many applications, such as robots, drones, and warning devices for children or individuals with vision limitations. Currently, these applications may detect an object within a fixed distance.

SUMMARY

In one embodiment a system to avoid obstacles, having an infrared emitter emitting an infrared pulse, an infrared receiver aligned with the infrared emitter so as to receive a reflection of the infrared pulse, a timer coupled to the infrared emitter and infrared receiver, the timer controlling a length of time the infrared emitter emits the infrared pulse and an exposure duration of the infrared receiver, the timer simultaneously initiates the emitting of the infrared pulse and an initiation of the exposure duration of the infrared receiver, and a controller coupled to the timer, the infrared emitter and the infrared receiver to adjust the exposure duration of the infrared receiver to determine a distance of an object reflecting the emitted infrared pulse.

In another embodiment a method to avoid obstacles, having emitting a ground truth infrared pulse, receiving a reflection of the ground truth infrared pulse within a ground truth exposure duration, wherein an initiation of the emission of the ground truth infrared pulse and an initiation of the ground truth exposure duration coincide temporally, determining a ground truth object distance based on a received reflection of the ground truth infrared pulse, emitting a second infrared pulse, receiving a second reflection of the second infrared pulse within a second pulse exposure duration, wherein an initiation of the emission of the second infrared pulse and the second pulse exposure duration coincide temporally, and wherein the second pulse exposure duration exceeds the ground truth exposure duration, and determining a second object distance based on a received reflection of the second infrared pulse.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

The present disclosure describes an electronic system for detecting obstacles using global shutter image sensors. A global shutter used by an image sensor exposes all sensor pixels simultaneously, which means that images obtained from cameras with these sensors were images to of a single point in time. A global shutter differs from a rolling shutter, which involves reading out individual row of pixels, going down the sensor.

Figure 1:
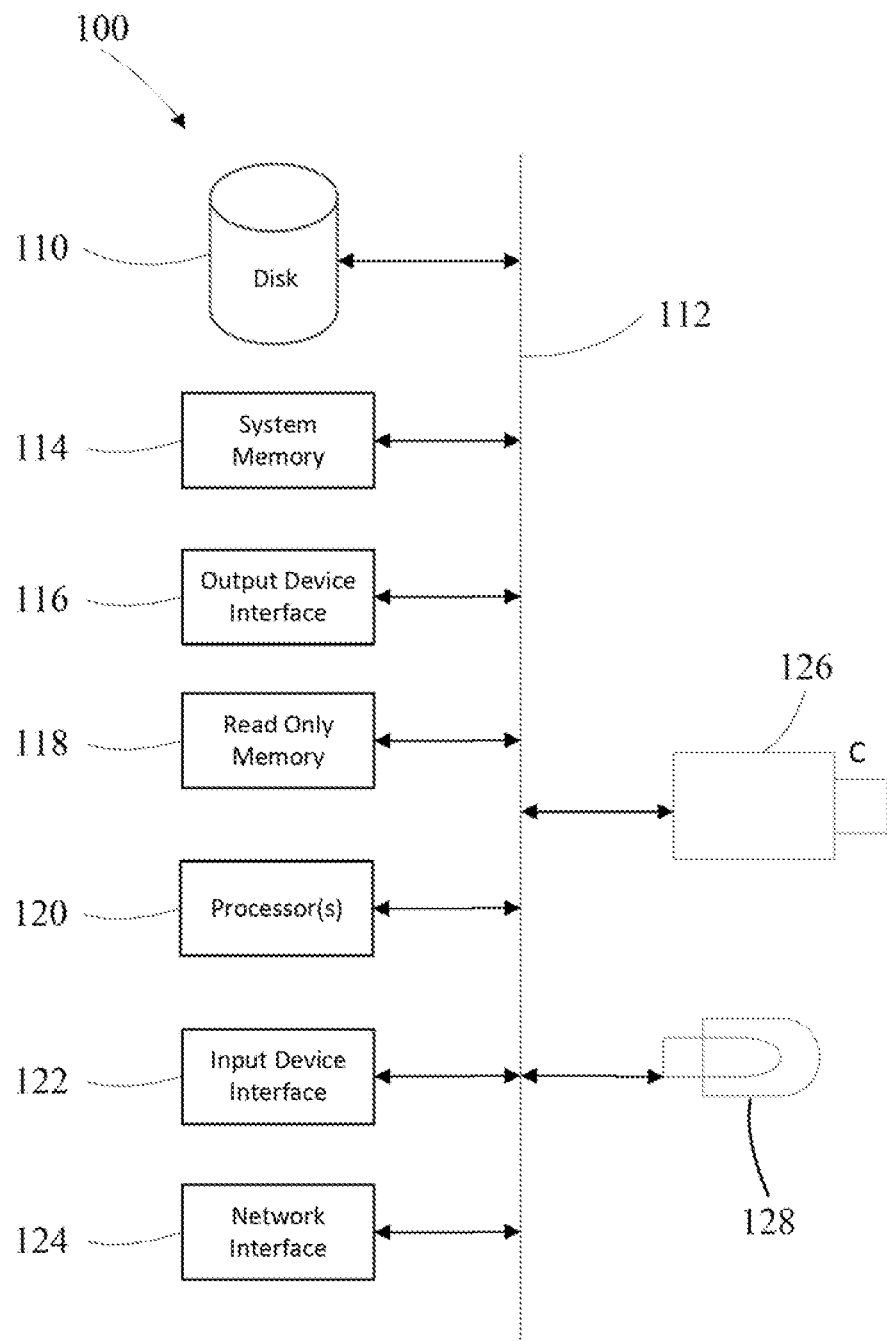
FIG. 1 is a first system diagram in accordance with one embodiment of the disclosure.

FIG. 1 depicts an example electronic system for use in connection with a vehicle. Electronic system 100 may be a computing device for execution of software associated with the operation of one or more portions or steps of process 400, or components and processes provided by FIG. 4. Electronic system 100 may be a car based embedded computer, an embedded computer, personal computer or a mobile device such as a tablet computer, laptop, smart phone, PDA, or other touch screen or television with one or more processors embedded therein or coupled thereto, or any other sort of computer-related electronic device having wireless connectivity.

Electronic system 100 may include various types of computer readable media and interfaces for various other types of computer readable media. In the depicted example, electronic system 100 includes a bus 112, processor(s) 120, a system memory 114, a read-only memory (ROM) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to the optical sensor 126 (i.e. camera) and the infrared emitter 128.

Bus 112 collectively represents all system, peripheral, and chipset buses that communicatively connect the numerous internal devices of electronic system 100. For instance, bus 112 communicatively connects processor(s) 120 with ROM 118, system memory 114, permanent storage device 110, optical sensor 126 (i.e. camera) and infrared emitter 128.

From these various memory units, processor(s) 120 retrieves instructions to execute and data to process in order to execute the processes of the subject disclosure. The processing unit(s) can be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system. Input devices used with input device interface 122 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touchscreen that functions as both input and output devices.

Finally, as shown in FIG. 1, bus 112 also couples electronic system 100 to a network (not shown) through network interfaces 124. Network interfaces 124 may include, for example, a is wireless access point (e.g., Bluetooth or WiFi) or radio circuitry for connecting to a wireless access point. Network interfaces 124 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) can be received from the client device at the server.

Figure 2:
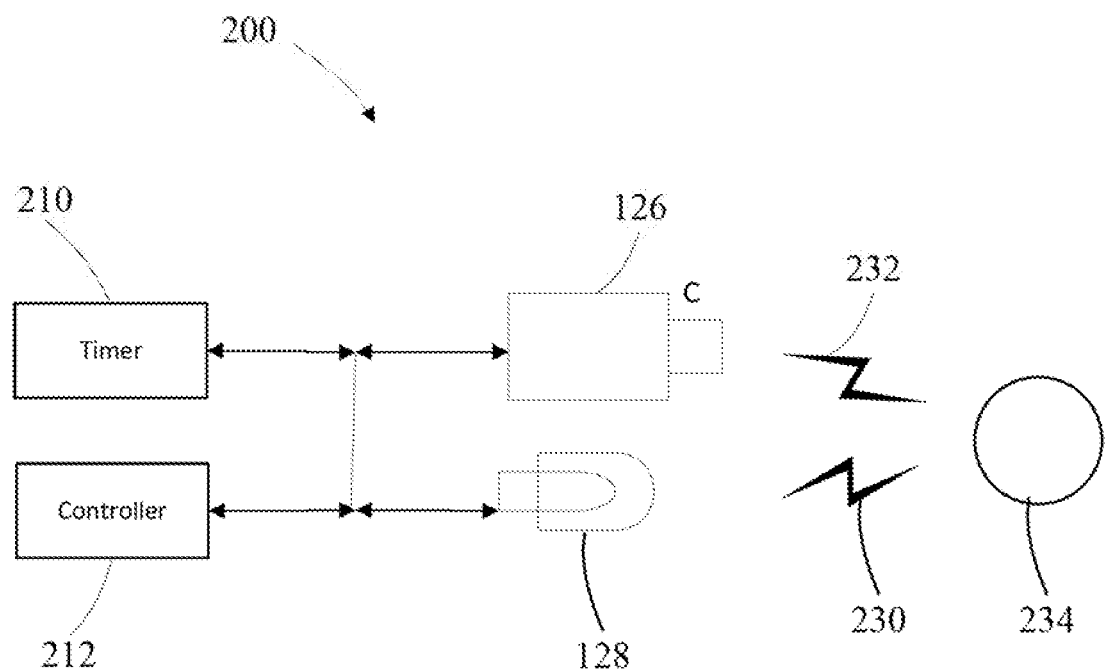
FIG. 2 is a second system diagram in accordance with one embodiment of the disclosure.

FIG. 2 depicts an example system to avoid obstacles 200. The system includes an infrared emitter 128 emitting an infrared pulse 230. The emitter may be one that emits at one intensity or emits at varying intensity depending upon object 234 detection distance. An infrared receiver 126 is aligned with the infrared emitter 128 so as to receive a reflection of the infrared pulse 232. The infrared receiver 126 may accept multiple wavelengths or specific wavelengths depending upon design. A timer 210 is coupled to the infrared emitter 128 and infrared receiver 126. The timer 210 controls a length of time the infrared emitter 128 emits the infrared pulse 230 and exposure duration of the infrared receiver 126. The timer 210 simultaneously initiates the is emitting of the infrared pulse 230 and an initiation of the exposure duration of the infrared receiver 126. A controller 212 is coupled to the timer 210, the infrared emitter 128 and the infrared receiver 126 to adjust the exposure duration of the infrared receiver to determine a distance of an object 234 reflecting the emitted infrared pulse 232.

Figure 3:
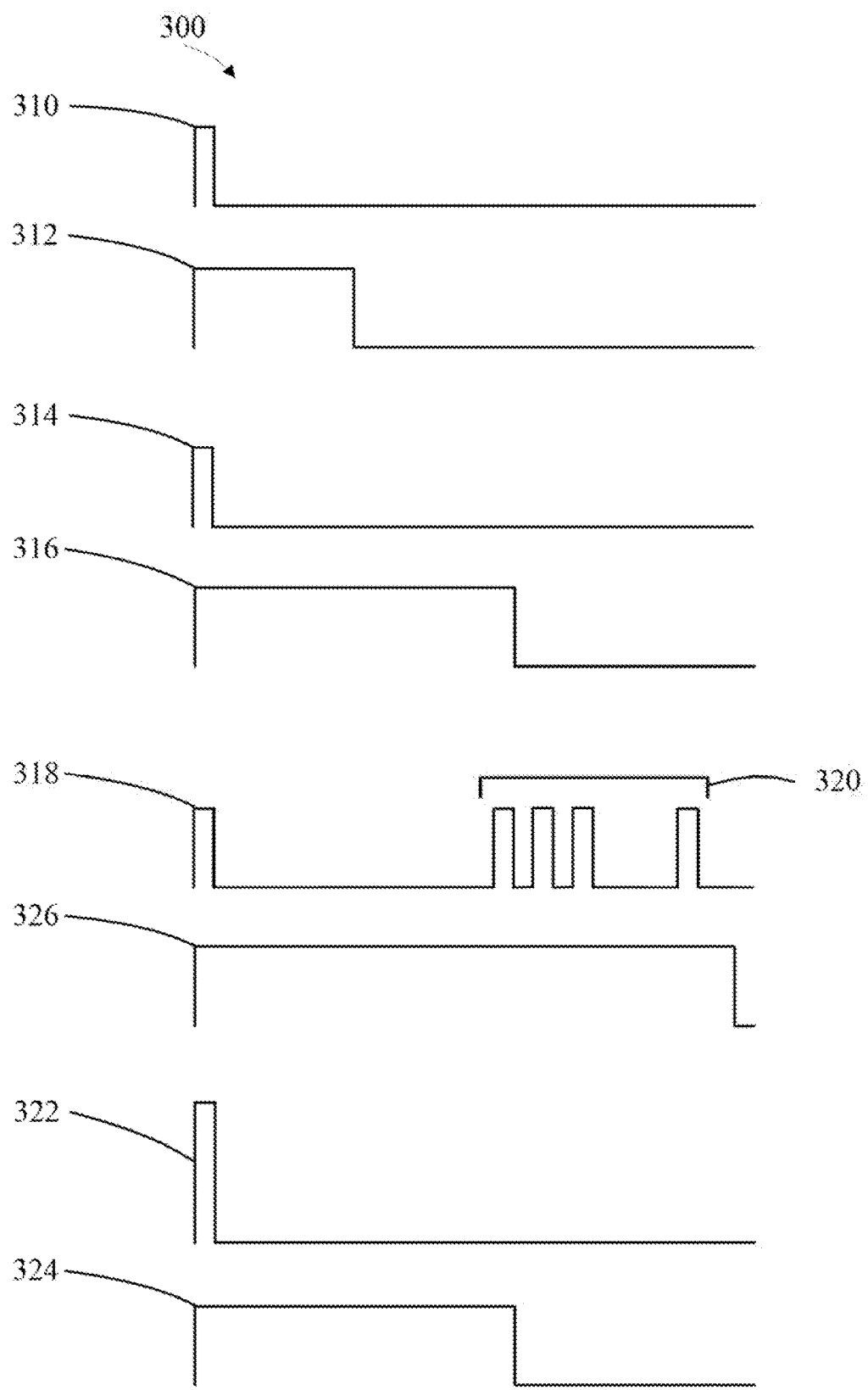
FIG. 3 is a set of emission and exposure pulses in accordance with one embodiment of the disclosure.

FIG. 3 depicts 300 the emitted pulses 310, 314, 318 and 322 and exposures 312, 316, 320 and 326 of an example method to avoid obstacles. A ground truth infrared pulse 310 is emitted toward an object (FIG. 2, 234) and a reflection of the ground truth infrared pulse is received within a ground truth exposure duration 312. The initiation of the emission of the ground truth 21 of 34 infrared pulse 310 and an initiation of the ground truth exposure duration 312 coincide temporally.

A second infrared pulse 314 is emitted toward the object (FIG. 2, 234) and a second reflection of the second infrared pulse is received within a second pulse exposure duration 316. The initiation of the emission of the second infrared pulse 314 and the second pulse exposure duration 316 coincide temporally. The second pulse exposure duration 316 exceeds the ground truth exposure duration 312.

N infrared initiation pulses 318 and N infrared modulated pulses 320 may be utilized to sense objects at varying distances, wherein the modulated pulses identifies the specific exposure to be used in distance detection for exposure 326.

The intensity of the emitted infrared pulse 322 may be dependent upon the pulse exposure duration 324.

Figure 4:
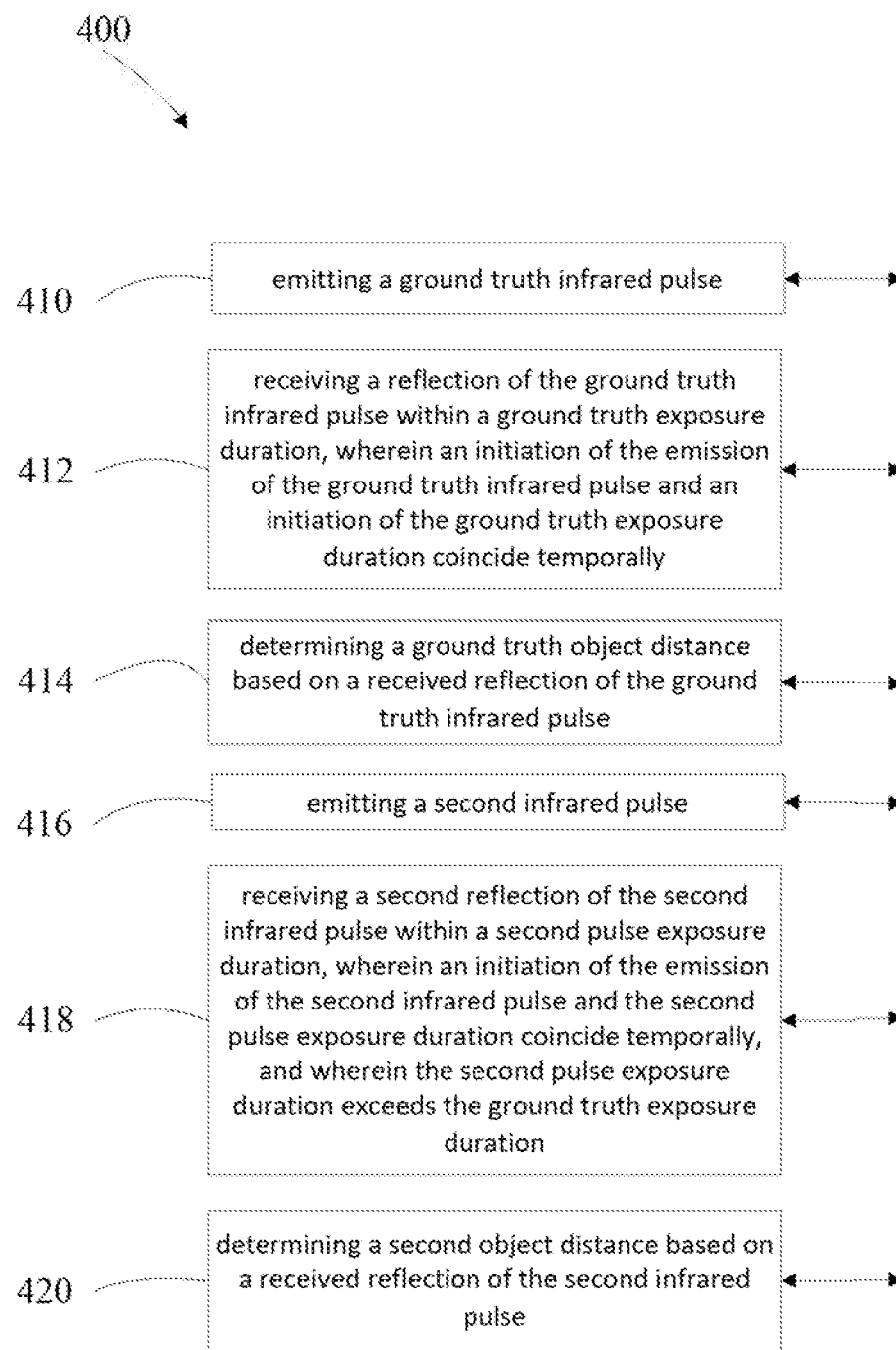
FIG. 4 is a first flow diagram in accordance with one embodiment of the disclosure.

FIG. 4 depicts one example of a method to avoid obstacles. The method emits 410 a ground truth infrared pulse (FIG. 3 310), receiving 412 a reflection of the ground truth infrared pulse within a ground truth exposure duration (FIG. 3, 312), wherein an initiation of the emission of the ground truth infrared pulse and an initiation of the ground truth exposure duration coincide temporally. The method includes determining 414 a ground truth object distance based on a received reflection of the ground truth infrared pulse. A second infrared pulse (FIG. 3, 314) is emitted 416. A second reflection of the second infrared pulse is received 418 within a second pulse exposure duration (FIG. 3, 316). The initiation of the emission of the second infrared pulse and the initiation of the second pulse exposure duration coincide temporally. The second pulse exposure duration exceeds the ground truth exposure duration. A second object distance is determined 420 based on a received reflection of the second infrared pulse.

If a range of 0 cm to 30 cm is the goal within which to detect obstacles, a global shutter camera with 2 ns ($2e-9$ s) of exposure time and an infrared light source may be used to detect the obstacle.

$$29{,}979{,}245{,}800 \text{ cm/s (speed of light)} * 2e-9$$
$$s \div 2 = 29.98 \text{ cm}$$

The pulse of the infrared light may be of arbitrary length as long as the pulse emission initiation time is the same as the exposure initiation time.

During this 2 ns exposure period, if a camera captures the infrared light pattern, an object may be detected within the range of 30 cm.

An example method to detect an object within a given distance utilizes a global shutter to camera and an infrared light source is depicted. In this example, the camera initiates image exposure at the same time the infrared emitter initiates light energy emission. By controlling the camera exposure duration the range may be adjusted. The obtained image may be compared with a ground truth image to decide if an object is present within this distance. The detection range is set by the adjustment of the exposure time of the global shutter image sensor.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A system to avoid obstacles, comprising:
   an infrared emitter emitting a plurality of infrared pulses at a plurality of wavelengths;
   an infrared receiver aligned with the infrared emitter so as to receive a reflection of the plurality of infrared pulses at the plurality of wavelengths;
   a timer coupled to the infrared emitter and infrared receiver, the timer controlling a length of time the infrared emitter emits the plurality of infrared pulses and an exposure duration of the infrared receiver via a global shutter, the timer simultaneously initiates the emitting of the plurality of infrared pulses and an initiates the exposure of the infrared receiver; and
   a controller coupled to the timer, the infrared emitter and the infrared receiver to adjust the exposure duration of the infrared receiver to determine a distance of an object reflecting the emitted plurality of infrared pulses and whether the object is present within the determined distance and wherein an intensity of the emitted plurality of infrared pulses is dependent upon the exposure duration and upon the distance of the object as set by an exposure time of the global shutter.

2. The system of claim 1, wherein an intensity of the plurality of infrared pulses is adjustable.

3. The system of claim 1, wherein the plurality of infrared pulses is modulated to differentiate individual emitted infrared pulses.

4. The system of claim 1, wherein the infrared receiver is a camera.

5. The system of claim 1, wherein the timer causes the infrared emitter to emit a ground truth infrared pulse of a predetermined emission length.

6. The system of claim 5, wherein the timer causes the infrared receiver to receive a reflected ground truth infrared pulse of a predetermined exposure duration to determine a ground truth image distance.

7. The system of claim 6, wherein a second pulse reflection distance is compared to the ground truth image distance.

8. The system of claim 1, wherein the timer causes an increase in the exposure duration of the infrared receiver until at least one of a maximum exposure duration and the object is detected.

9. The system of claim 8, wherein the controller causes the infrared emitter to increase pulse intensity in accordance with the exposure duration.

10. The system of claim 1, wherein the infrared emitter emits an initiation pulse and a modulated pulse and wherein the infrared receiver receives a reflected initiation pulse and a reflected modulated pulse to determine the object distance.

11. The system of claim 1, wherein the infrared emitter emits a series of individual initiation pulses and individual modulated pulses to sense objects at varying distances.

12. A method to avoid obstacles, comprising:
    emitting a ground truth infrared pulse at a first wavelength;
    receiving a reflection of the ground truth infrared pulse at the first wavelength within a ground truth exposure duration, wherein an initiation of the emission of the ground truth infrared pulse and an initiation of the ground truth exposure duration coincide temporally;
    determining a ground truth object distance based on a received reflection of the ground truth infrared pulse;
    emitting a second infrared pulse at a second wavelength;
    receiving a second reflection of the second infrared pulse at the second wavelength within a second pulse exposure duration, wherein an initiation of the emission of the second infrared pulse and an initiation of the second pulse exposure duration coincide temporally, and wherein the second pulse exposure duration exceeds the ground truth exposure duration; and
    determining a second object distance based on a received reflection of the second infrared pulse and whether the object is present within the determined second object distance and wherein an intensity of the emitted second infrared pulse is dependent upon the second pulse exposure duration and upon the distance of the second object as set by an exposure time of a global shutter.

13. The method of claim 12, wherein an intensity of the ground truth infrared pulse is predetermined.

14. The method of claim 13, wherein an intensity of the second infrared pulse is greater than the ground truth infrared pulse.

15. The method of claim 12, wherein the second infrared pulse is modulated to differentiate the second infrared pulse from the ground truth infrared pulse.

16. The method of claim 12, further comprising comparing the second object distance to the ground truth object distance.

17. The method of claim 12, further comprising emitting n infrared initiation pulses and n infrared modulated pulses to sense objects at varying distances.

18. The method of claim 17, wherein the modulated pulses are serialized.

19. The method of claim 17, wherein the modulated pulses have varying emission intensities.

20. The method of claim 12, wherein the receiving of the reflected ground truth infrared pulse and the reflected second infrared pulse is performed by a camera.

* * * * *